(12) United States Patent
Lee et al.

(10) Patent No.: US 11,635,780 B2
(45) Date of Patent: Apr. 25, 2023

(54) MAXIMUM POWER POINT TRACKING APPARATUS FOR ENERGY HARVESTING SYSTEM AND MAXIMUM POWER POINT TRACKING CONTROL METHOD

(71) Applicants: SKAIChips Co., Ltd., Suwon-si (KR); Research & Business Foundation SUNGKYUNKWAN UNIVERSITY, Suwon-si (KR)

(72) Inventors: Kang Yoon Lee, Seoul (KR); Jong Wan Jo, Suwon-si (KR); Kyung Duk Choi, Suwon-si (KR); Young Gun Pu, Suwon-si (KR)

(73) Assignees: SKAIChips Co., Ltd., Suwon-si (KR); Research & Business Foundation SUNGKYUNKWAN UNIVERSITY, Suwon-si (KR)

( * ) Notice: Subject to any disclaimer, the term of this patent is extended or adjusted under 35 U.S.C. 154(b) by 91 days.

(21) Appl. No.: 17/329,158

(22) Filed: May 25, 2021

(65) Prior Publication Data
US 2021/0376729 A1   Dec. 2, 2021

(30) Foreign Application Priority Data
May 29, 2020   (KR) .................. 10-2020-0065509

(51) Int. Cl.
*G05F 1/67* (2006.01)
*H02M 3/157* (2006.01)
*H02J 50/00* (2016.01)
*H02M 1/00* (2006.01)

(52) U.S. Cl.
CPC .............. *G05F 1/67* (2013.01); *H02J 50/001* (2020.01); *H02M 1/0025* (2021.05); *H02M 3/157* (2013.01)

(58) Field of Classification Search
CPC ............. H02M 3/1582; H02M 1/0032; H02M 3/1566; H02M 3/157; H02H 50/001; G05F 1/67
See application file for complete search history.

(56) References Cited

U.S. PATENT DOCUMENTS

| | | | |
|---|---|---|---|
| 8,461,820 B2* | 6/2013 | Fieldhouse | G05F 1/67 323/299 |
| 9,991,715 B1* | 6/2018 | Huang | H02M 1/08 |
| 2007/0257653 A1* | 11/2007 | Naka | H02M 3/157 323/284 |

(Continued)

FOREIGN PATENT DOCUMENTS

KR   10-1768385 B1   8/2017

OTHER PUBLICATIONS

Office Action dated Jul. 6, 2021 from Korean Intellectual Property Office for Korean Patent Application No. 10-2020-0065509.

*Primary Examiner* — Gustavo A Rosario-Benitez
(74) *Attorney, Agent, or Firm* — Insight Law Group, PLLC; Seung Lee (57) ABSTRACT

Provided is a maximum power point tracking (MPPT) apparatus for an energy harvesting system and an MPPT control method. A count value of the time for an output voltage of a direct current (DC)-DC converter to reach a high reference voltage is used to change and output a control parameter of the DC-DC converter for maximum power.

12 Claims, 9 Drawing Sheets

(56) References Cited

U.S. PATENT DOCUMENTS

| | | | | |
|---|---|---|---|---|
| 2009/0218999 A1* | 9/2009 | Kikuchi | ................ | H02M 3/156 |
| | | | | 323/282 |
| 2012/0326512 A1* | 12/2012 | Yokoyama | .............. | H02J 1/108 |
| | | | | 307/62 |
| 2013/0121032 A1* | 5/2013 | Shi | .................... | H02M 3/33507 |
| | | | | 363/16 |
| 2013/0134955 A1* | 5/2013 | Bettenwort | ............... | G05F 1/67 |
| | | | | 323/299 |
| 2013/0181655 A1* | 7/2013 | Yokoyama | ................ | H02J 7/35 |
| | | | | 320/101 |
| 2014/0300385 A1* | 10/2014 | Chen | .................. | G01R 31/2851 |
| | | | | 324/762.01 |
| 2015/0349636 A1* | 12/2015 | Bodano | .................. | H02M 1/32 |
| | | | | 323/271 |
| 2019/0149063 A1* | 5/2019 | Onda | ...................... | B60L 3/003 |
| | | | | 361/30 |
| 2020/0195161 A1* | 6/2020 | Mayell | .............. | H02M 3/33592 |

* cited by examiner

MAXIMUM POWER POINT TRACKING APPARATUS FOR ENERGY HARVESTING SYSTEM AND MAXIMUM POWER POINT TRACKING CONTROL METHOD

CROSS-REFERENCE TO RELATED APPLICATION(S)

This application claims priority from Korean Patent Application No. 10-2020-0065509, filed on May 29, 2020, in the Korean Intellectual Property Office, the disclosure of which is incorporated herein by reference in its entirety.

BACKGROUND

1. Field

The following description relates to an electric power technology and, more particularly, to a maximum power point tracking technology appropriate for an energy harvesting system.

2. Description of Related Art

In an energy harvesting system, a maximum power point tracking (MPPT) scheme is used to supply power to an output load terminal with high efficiency. According to a common MPPT scheme, the power of an output load terminal is detected, and a load or the power of an input terminal is adjusted to maximize the output power. To detect power, it is necessary to detect both a voltage and a current through an analog-to-digital converter, a digital-to-analog converter, and the like. Due to additional circuits such as a voltage detection circuit, a current detection circuit, the analog-to-digital converter, and the digital-to-analog converter, power consumption increases. Also, when a semiconductor integrated circuit (IC) is used, the chip area increases due to these analog elements. Further, when a load or the power of an input terminal is adjusted to track a maximum power point, additional time is consumed to stabilize an output terminal.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

The following description relates to a maximum power point tracking (MPPT) scheme of an energy harvesting system in which additional circuits are minimized.

The following description relates to reducing power consumption in an MPPT scheme of an energy harvesting system The following description relates to reducing the chip area of an integrated circuit (IC) in which an MPPT scheme of an energy harvesting system is implemented The following description relates to increasing a settling rate in an MPPT scheme of an energy harvesting system In one general aspect, an MPPT apparatus outputs a control parameter of a direct current (DC)-DC converter for minimizing a count value of the time for an output voltage of the DC-DC converter to reach a high reference voltage VREFH.

In another general aspect, the control parameter may include a mode control word (MCW) for setting the DC-DC converter to operate in one of a pulse width modulation (PWM) mode and a pulse frequency modulation (PFM) mode.

In an additional aspect, the time from a time point at which the output voltage of the DC-DC converter reaches a low reference voltage to a time point at which the output voltage reaches the high reference voltage may be counted.

In an additional aspect, when the output voltage of the DC-DC converter reaches the high reference voltage, the output voltage may be discharged at a level of the low reference voltage or less.

In an additional aspect, a load condition may be determined by changing the low reference voltage and the high reference voltage.

In an additional aspect, when a difference between the count value in the PFM mode and the count value in the PWM mode is greater than a modulation reference value, the modulation mode may be set to the modulation mode in which the count value is smaller.

In an additional aspect, when the count value difference between the modulation modes is smaller than the modulation reference value, a charging time $T_{CH}$ may be increased until the difference reaches the modulation reference value.

In an additional aspect, when the modulation mode is determined, a core size may be changed and a count value may be checked to determine the core size.

Other features and aspects will be apparent from the following detailed description, the drawings, and the claims.

Throughout the drawings and the detailed description, unless otherwise described, the same drawing reference numerals will be understood as referring to the same elements, features, and structures. The relative size and depiction of these elements may be exaggerated for clarity, illustration, and convenience.

DETAILED DESCRIPTION

The above-described aspects and additional aspects will be specified through exemplary embodiments described below with reference to the accompanying drawings. Elements of each exemplary embodiment are intended to be combinable in various ways within the exemplary embodiment or combinable with elements of other exemplary embodiments in various ways unless mentioned otherwise or is contradicted in the context. On the basis of the principle that the inventor can appropriately define concepts of terms for describing his or her invention in the best way, terms used herein and the claims should be interpreted as having the meanings and concepts which are consistent with the description or the proposed technical spirit. Hereinafter, the exemplary embodiments of the present invention will be described in detail with reference to the accompanying drawings.

Figure 1:
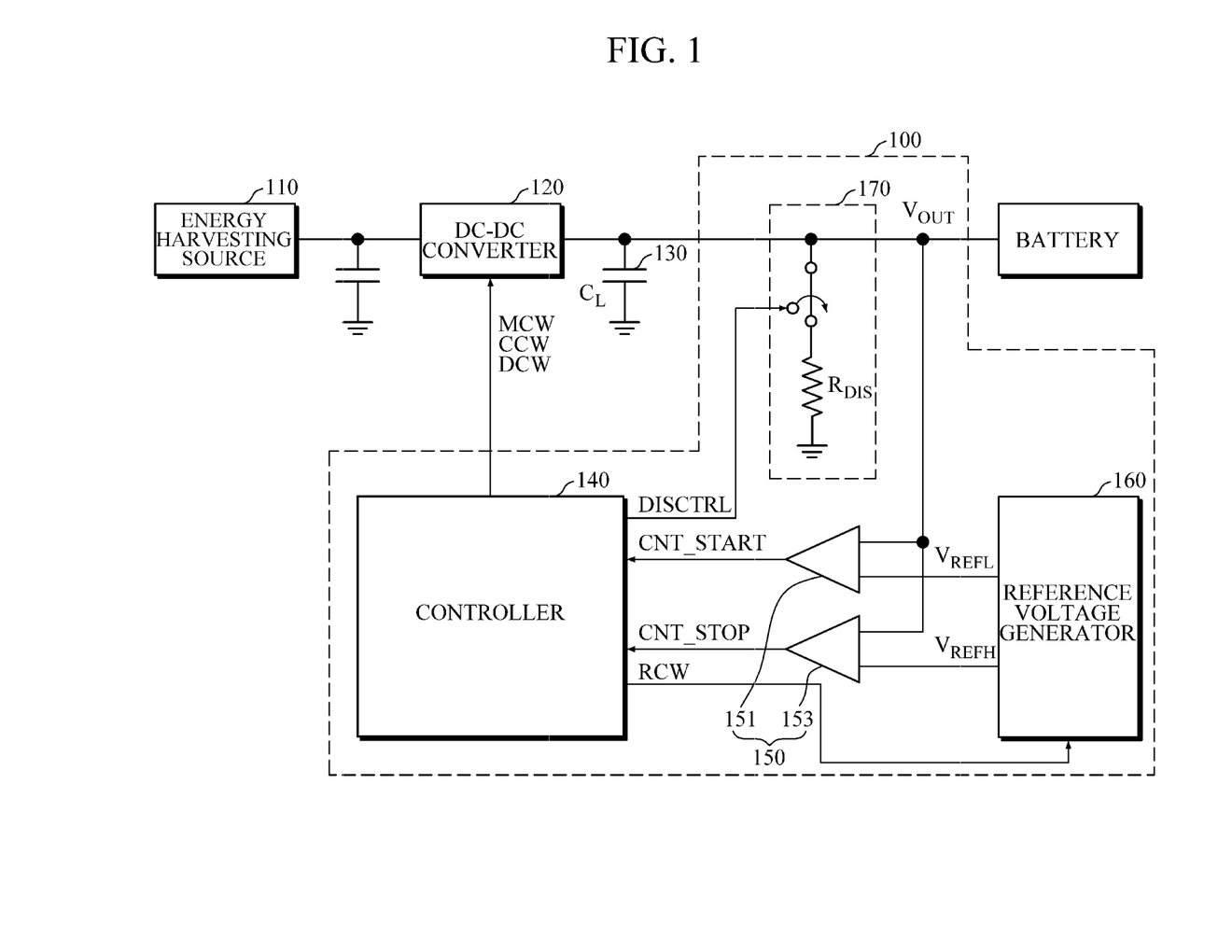
FIG. 1 is a block diagram showing a configuration of an energy harvesting system to which a maximum power point tracking (MPPT) apparatus according to an exemplary embodiment of the present invention is applied.

FIG. 1 is a block diagram showing a configuration of an energy harvesting system to which a maximum power point tracking (MPPT) apparatus according to an exemplary embodiment of the present invention is applied. In FIG. 1, a part indicated by a broken line is a block diagram showing a configuration of a MPPT apparatus 100 according to the present invention.

According to an aspect, the MPPT apparatus 100 outputs a control parameter of a direct current (DC)-DC converter for minimizing a count value of the time for an output voltage of the DC-DC converter to reach a high reference voltage VREFH. As shown in the drawing, the energy harvesting system according to the exemplary embodiment includes an energy harvesting source 110, a DC-DC converter 120, an output capacitor ($C_L$) 130, and the MPPT apparatus 100. In the illustrated exemplary embodiment, at least a part of the circuit of the energy harvesting source 110 and the DC-DC converter 120 may be implemented as one semiconductor integrated circuit (IC). The MPPT apparatus 100 may be implemented as a part of the semiconductor IC or a separate IC. In many cases, a high-capacity electrical element, such as the output capacitor 130, is implemented as an external individual part of the IC.

The energy harvesting source 110 generates power from any one of surrounding energy sources, such as solar energy, thermal energy, physical energy, radio wave energy, gravitational energy, and vibration energy, and outputs the power. In the illustrated exemplary embodiment, the energy harvesting source 110 outputs a time-varying DC signal. The DC-DC converter 120 switches the time-varying DC signal of the energy harvesting source 110 and outputs a DC signal which is more stabilized, that is, smoothed. In the illustrated exemplary embodiment, the output capacitor 130 is charged with the output DC signal.

According to an aspect of the proposed invention, the MPPT apparatus 100 includes a comparison part 150 and a controller 140. The comparison part 150 includes a first comparator 153 which compares an output voltage of the DC-DC converter 120 with the high reference voltage VREFH. For example, the high reference voltage VREFH may be generated from a bandgap reference voltage circuit.

The controller 140 operates on the basis of a signal output through the comparison part 150, changes a control parameter of the DC-DC converter 120 to maximize power using a count value of a counter which measures the time for the output voltage of the DC-DC converter 120 to reach the high reference voltage VREFH, and outputs the control parameter.

Figure 2:
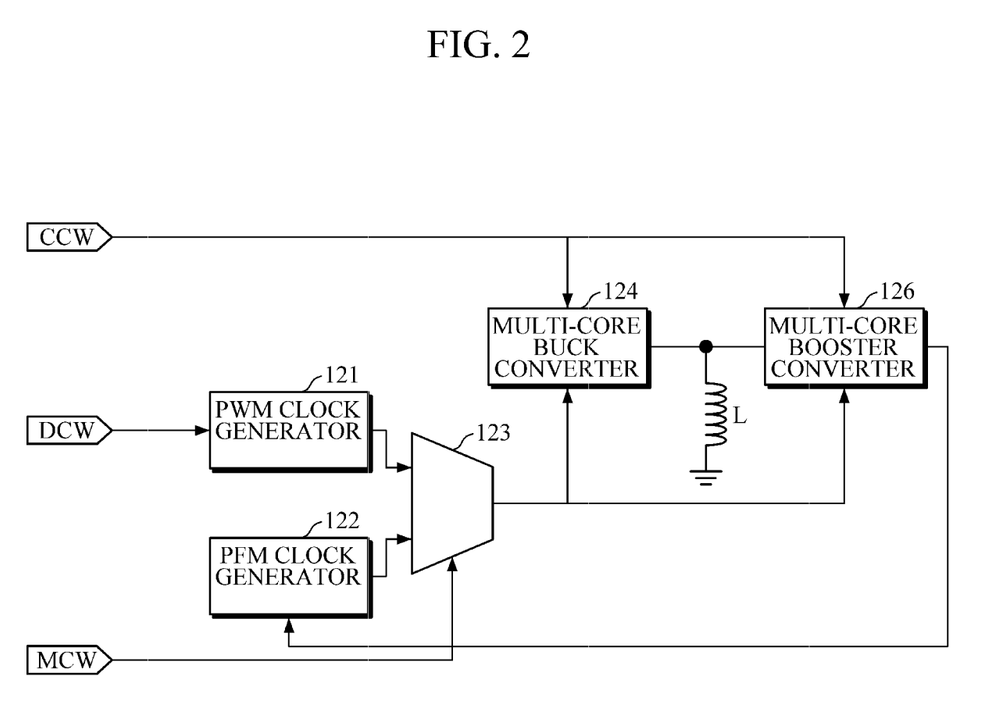
FIG. 2 is a block diagram showing a configuration of a direct current (DC)-DC converter in the exemplary embodiment shown in FIG. 1.

FIG. 2 is a block diagram showing a configuration of the DC-DC converter 120 in the exemplary embodiment shown in FIG. 1. In the illustrated exemplary embodiment, the DC-DC converter 120 is implemented as a buck-boost converter including a multi-core buck converter 124 and a multi-core booster converter 126. The multi-core buck converter 124 includes a plurality of transformers having different sized cores. Also, the illustrated multi-core booster converter 126 includes a plurality of transformers having different sized cores. In the illustrated exemplary embodiment, the buck-boost converter including the multi-core booster converter 126 may operate in one of a pulse width modulation (PWM) scheme and a pulse frequency modulation (PFM) scheme.

General modulation modes of a buck-boost converter may be classified into a PWM scheme and a PFM scheme according to a switching clock of a gate switch. In the PWM scheme, a switching clock has a fixed frequency and a duty cycle varying according to an output signal. This scheme is effective for maintaining the output voltage under a heavy load. However, since a switching operation is performed every period, relatively large power loss may occur under a light load. In the PFM scheme, a switch is operated only when necessary. This scheme may increase conversion efficiency. However, the output ripple characteristic is not good, and thus it is difficult to maintain the output voltage under a heavy load. In the illustrated exemplary embodiment, the buck-boost converter operates in the PWM scheme under a heavy load and operates in the PFM scheme under a light load.

According to an aspect, the control parameter output by the controller 140 may include a mode control word (MCVV). The MCW sets the DC-DC converter 120 to operate in one of the PWM mode and PFM mode. The controller 140 may determine whether a load is heavy or light by feedback of the output voltage to determine a modulation mode.

In the illustrated exemplary embodiment, a PWM clock generator 121 generates a switching clock, which is synchronized with a reference clock and a duty cycle according to a duty control word (DCW) output from the controller 140 of FIG. 1, and outputs the switching clock. In the illustrated exemplary embodiment, a PFM clock generator 122 generates a switching clock, which is switched according to the output voltage, and outputs the switching clock. A multiplexer 123 selects one of the outputs of the PWM clock generator 121 and the PFM clock generator 122 according to the MCW and supplies the selected output to the gate switching logic of the multi-core buck converter 124 and the gate switching logic of the multi-core booster converter 126 as a switching clock.

In addition, the control parameter output by the controller 140 may include a core control word (CCW). The CCW is set so that one of the plurality of different sized cores is selected. The controller 140 may feed back the output voltage to determine an appropriate one of the plurality of cores.

In addition, the control parameter output by the controller 140 may include the DCW. The DCW represents a duty value which determines the duty cycle of a pulse in the PWM mode. The PWM clock generator 121 generates and outputs a switching clock having a duty cycle which is determined according to the DCW.

Figure 3:
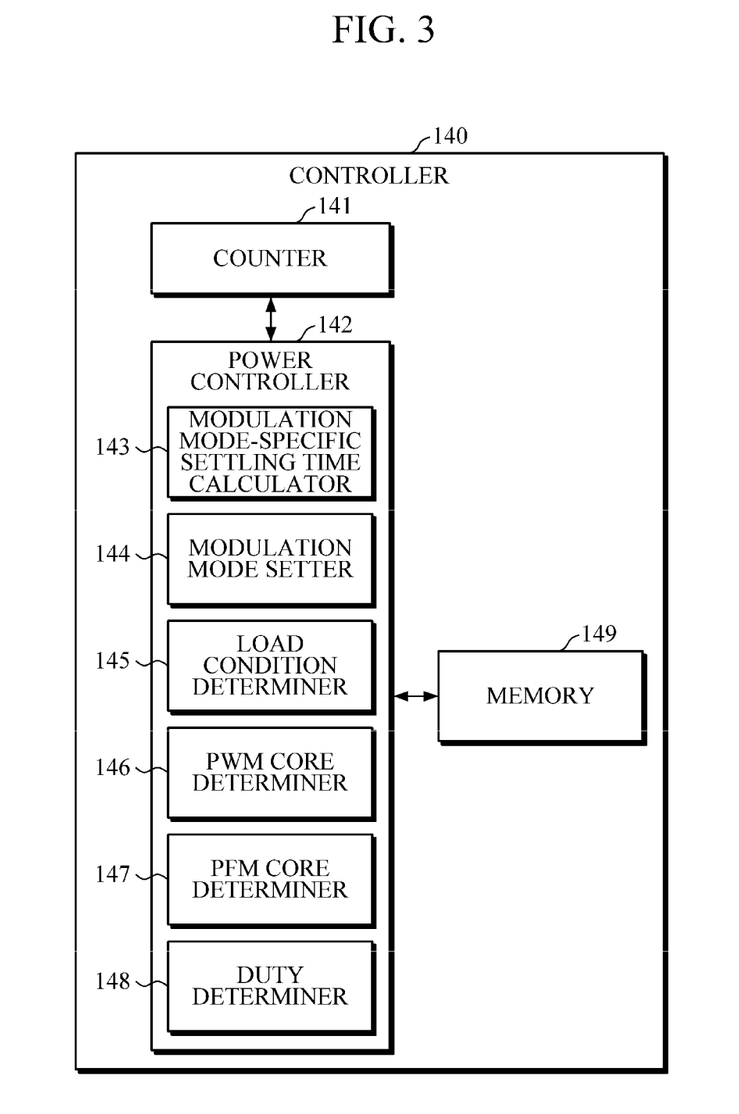
FIG. 3 is a block diagram showing a configuration of a controller in the MPPT apparatus according to the exemplary embodiment shown in FIG. 1.

FIG. 3 is a block diagram showing a configuration of the controller 140 in the MPPT apparatus 100 according to the exemplary embodiment shown in FIG. 1. The illustrated exemplary embodiment may be implemented as a memory and a microprocessor which processes information by executing program instructions stored in the memory under the control of an operating system (OS) stored in the memory. In the block diagram, each block may be implemented with a program instruction set, or with a plurality of program instruction set which perform the same function seperately.

According to an aspect, the controller 140 includes a counter 141 and a power controller 142. The counter 141 operates on the basis of the signal output through the comparison part 150 of FIG. 1 to measure the time for the output voltage of the DC-DC converter 120 to reach the high reference voltage VREFH. For example, the counter 141 performs a count operation while the output of the first comparator 153 is active.

According to an additional aspect, the comparison part 150 may further include a second comparator 151. The second comparator 151 compares the output voltage of the DC-DC converter 120 and a low reference voltage VREFL. Here, the counter 141 counts the time from an output time point of the second comparator 151 of the DC-DC converter 120 to an output time point of the first comparator 153. In the illustrated exemplary embodiment, the high reference voltage VREFH and the low reference voltage VREFL are generated and output by a reference voltage generator 160. For example, the reference voltage generator 160 may include a bandgap reference voltage circuit. The reference voltage generator 160 includes a controllable resistor therein. When a value of the resistor is set by a resistor control word (RCW), the high reference voltage VREFH and the low reference voltage VREFL vary. In the illustrated exemplary embodiment, when an RCW value increases, the high reference voltage VREFH is raised, and the low reference voltage VREFL is lowered such that a charging time $T_{CH}$ increases.

Figure 4:
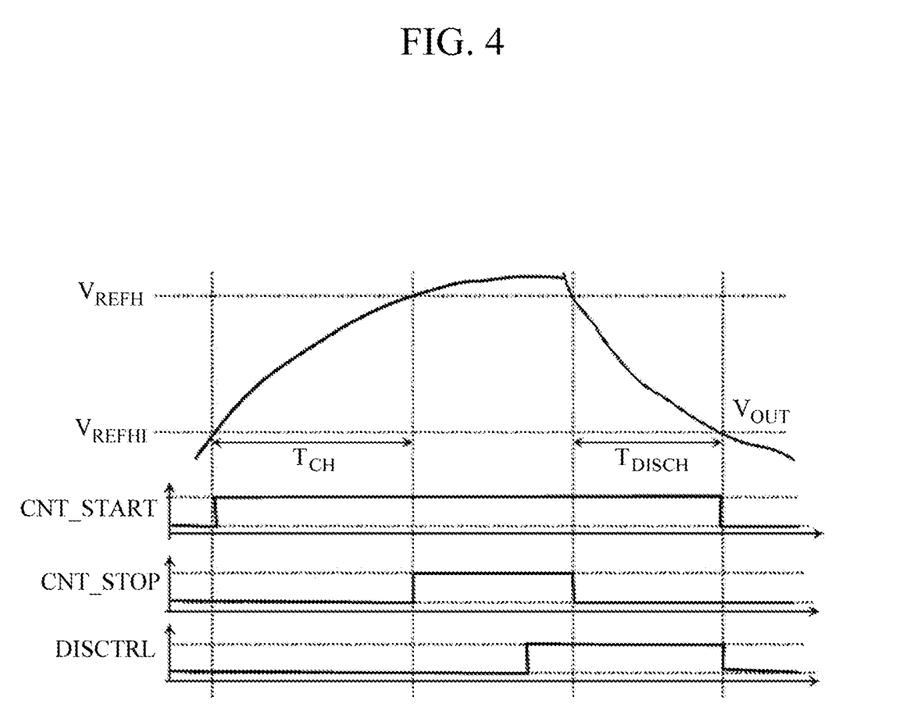
FIG. 4 is an exemplary timing diagram showing a charging period of a DC-DC converter to which the MPPT apparatus according to the exemplary embodiment of the present invention is applied.

FIG. 4 is an exemplary timing diagram showing a charging period of a DC-DC converter to which the MPPT apparatus according to the exemplary embodiment of the present invention is applied. As shown in the drawing, when an output voltage VOUT of the DC-DC converter 120 becomes higher than the low reference voltage VREFL, a count start signal CNT_START is activated. Also, when the output voltage VOUT of the DC-DC converter 120 becomes higher than the high reference voltage VREFH, a count stop signal CNT_STOP is activated. The counter 141 starts counting when the count start signal CNT_START is activated and finishes counting when the count stop signal CNT_STOP is activated. In this way, the counter 141 reflects the time from a time point at which the output voltage VOUT of the DC-DC converter 120 reaches the low reference voltage VREFL to a time point at which the output voltage VOUT reaches the high reference voltage VREFH. For example, the low reference voltage VREFL and the high reference voltage VREFH may be set so that a count value of the counter 141 reflects a settling time.

The count value of the counter 141 is stored in a memory 149. A current count value may be compared with an immediately preceding stored count value to track a maximum power point with the smaller count value. As another example, the count value may be accumulated a certain number of times, and it may be determined that the average of the accumulated values is a reference value. The average value of the accumulated values in each period is compared with the average value of the accumulated values in an immediately preceding period, and the control parameter values of the DC-DC converter 120 for the next period may be determined according to the comparison result to reduce the settling time.

According to an aspect, the MPPT apparatus may further include a discharge part 170. After the DC-DC converter 120 reaches the high reference voltage VREFH, the discharge part 170 discharges the output voltage at a level of the low reference voltage or less according to the control of the controller 140.

Figure 5:
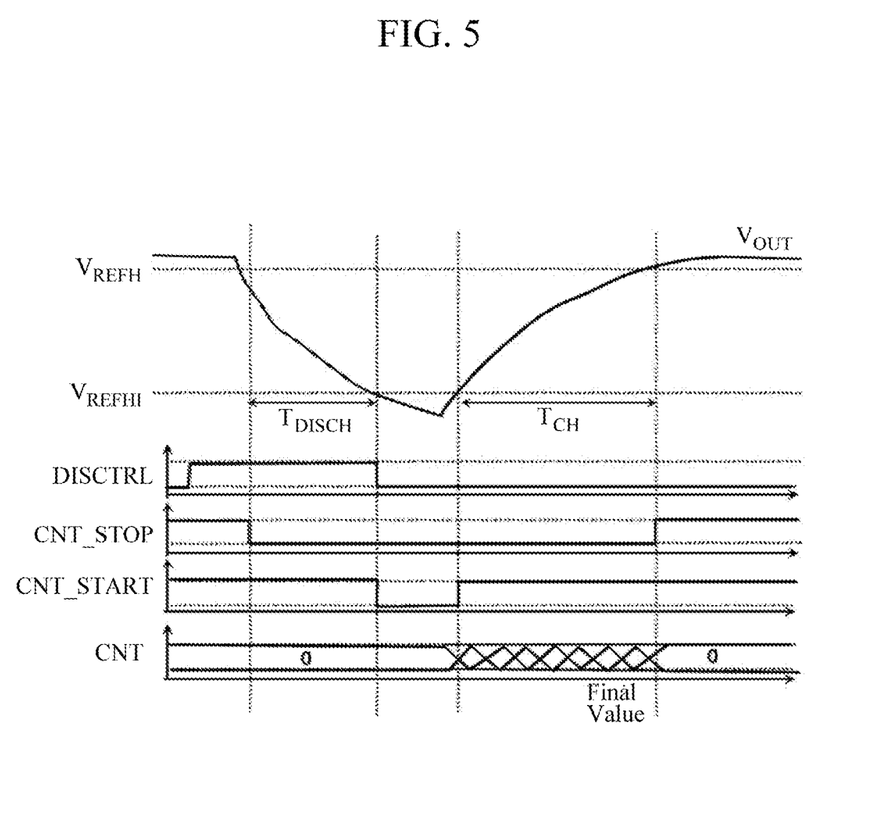
FIG. 5 is an exemplary timing diagram showing a discharge period of a DC-DC converter to which the MPPT apparatus according to the exemplary embodiment of the present invention is applied.

FIG. 5 is an exemplary timing diagram showing a discharge period of a DC-DC converter to which the MPPT apparatus according to the exemplary embodiment of the present invention is applied. As described above with reference to FIG. 4, after a settling time of the output voltage VOUT of the DC-DC converter 120 is checked during the charging period, the output voltage VOUT of the DC-DC converter 120 is required to drop to the low reference voltage VREFL or less. The proposed MPPT apparatus generates a discharge control signal DISCTRL, connects a discharge resistor RDIS to an output terminal, and thereby controls the output voltage VOUT of the DC-DC converter 120 to drop to the low reference voltage VREFL or less. When the output voltage VOUT is lowered to the low reference voltage VREFL or less, an operation for checking the settling time as shown in FIG. 4 may be repeated.

According to an aspect, the MPPT apparatus may further include the reference voltage generator 160. The reference voltage generator 160 generates the low reference voltage and the high reference voltage determined according to the control of the controller 140 and outputs the low reference voltage and the high reference voltage to the comparison part 150. The reference voltage generator 160 generates reference voltages according to instructions of the controller 140 through a reference voltage generation circuit well known in the electric power field such as a bandgap voltage reference circuit which is a temperature-independent reference voltage circuit.

The controller 140 determines a load condition by controlling the reference voltage generator 160. The controller 140 may change the low reference voltage and the high reference voltage by outputting a reference voltage control word (the RCW) to the reference voltage generator 160 and thereby determine the load condition.

According to an aspect, the power controller 142 may further include a modulation mode-specific settling time calculator 143 and a modulation mode setter 144. The modulation mode-specific settling time calculator 143 calculates a difference between count values of the counter 141 in the PFM mode and the PWM mode. In other words, the modulation mode-specific settling time calculator 143 calculates a difference between a count value output by the counter 141 when the modulation mode of the DC-DC converter 120 is set to the PFM mode and a count value output by the counter 141 when the modulation mode is set to the PWM mode. The modulation mode setter 144 sets the modulation mode to the modulation mode in which the count value is smaller when the count value difference calculated by the modulation mode-specific settling time calculator 143 is larger than a modulation reference value. In other words, when the count value difference calculated by the modulation mode-specific settling time calculator 143 is larger than the modulation reference value, the modulation mode setter 144 sets the modulation mode to the modulation mode in which the count value is smaller between the count value output by the counter 141 in the PFM mode and the count value output by the counter 141 in the PWM mode. Here, it is determined that the "modulation reference value" is a minimum count value difference for determining characteristics of the two operation modes.

According to an additional aspect, the power controller 142 may further include a load condition determiner 145. When the count value difference calculated by the modulation mode-specific settling time calculator 143 is smaller than the modulation reference value, the load condition determiner 145 increases a charging time among the charging time and a discharge time of a switching period until the count value difference reaches the modulation reference value. FIGS. 4 and 5 illustrate a charging time $T_{CH}$ and a discharge time $T_{DISCH}$ in a switching period. Accordingly, there may be a substantially meaningful count value difference between the two operation modes.

Referring back to FIG. 3, according to an additional aspect, the power controller 142 may further include a PWM core determiner 146 and a PFM core determiner 147. When it is determined that the modulation mode is the PWM mode, the PWM core determiner 146 changes a core size, checks the count value, and determines the core size. According to the exemplary embodiment, the PWM core determiner 146 checks the count value of the counter 141 while changing a core size and determines the core size so that the count value is reduced. When it is determined that the modulation mode is the PFM mode, the PFM core determiner 147 changes a core size, checks the count value, and determines the core size. According to the exemplary embodiment, the PFM core determiner 147 checks the count value of the counter 141 while changing a core size and determines the core size so that the count value is reduced.

According to an additional aspect, the power controller 142 may further include a duty determiner 148. The duty determiner 148 determines a PWM duty cycle of the DC-DC converter 120 to reduce the count value of the counter 141 and outputs the PWM duty cycle.

Figure 6:
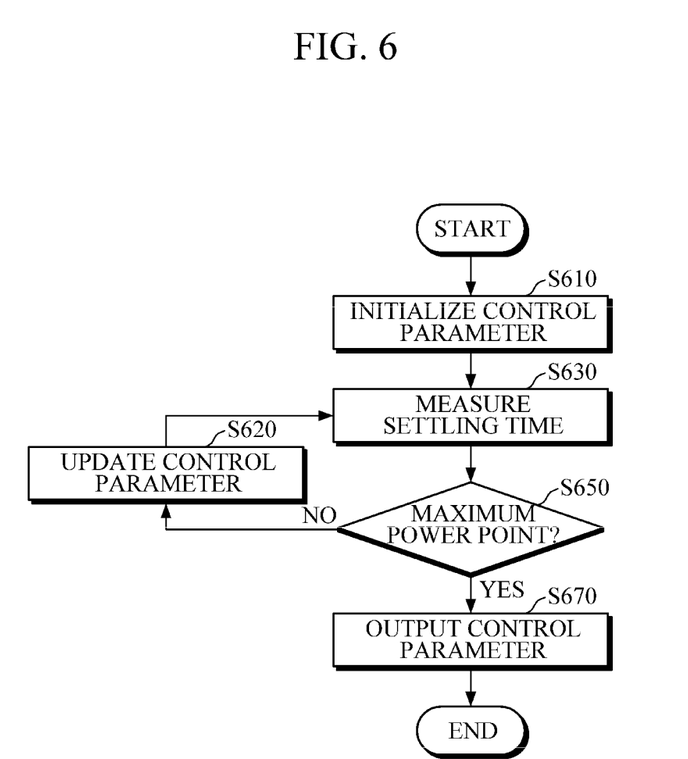
FIG. 6 is a flowchart illustrating an MPPT control method in an energy harvesting system according to a first exemplary embodiment.

FIG. 6 is a flowchart illustrating an MPPT control method in an energy harvesting system according to a first exemplary embodiment. According to an aspect, the MPPT control method is performed by an MPPT controller connected to a DC-DC converter of the energy harvesting system. For example, such a controller may be the MPPT apparatus which is shown in FIG. 1 and described above.

As shown in the drawing, first, a control parameter of the DC-DC converter is initialized (S610). According to an aspect, the MPPT control method includes a settling time measurement operation (S630). In the settling time measurement operation (S630), the controller counts the time until the output voltage of the DC-DC converter reaches a high reference voltage VREFH. According to an additional aspect, in the settling time measurement operation (S630), time counting may be started from a time point at which the output voltage of the DC-DC converter is a low reference voltage VREFL. A settling time is measured for the DC-DC converter which operates according to the set control parameter. This is similar to the above descriptions of FIGS. 4 and 5.

According to an aspect, the MPPT control method includes a control parameter update operation (S620). In the control parameter update operation (S620), the controller updates the control parameter of the DC-DC converter. According to an exemplary embodiment, the controller may update the control parameter so that a count value is reduced. For example, the controller may update the control parameter by increasing or decreasing the control parameter by a unit size for every loop.

According to an aspect, the MPPT control method includes a maximum power point determination operation (S650). In the maximum power point determination operation (S650), the controller determines and outputs a control parameter for minimizing the count value as a maximum power point. In the maximum power point determination operation (S650), the controller monitors count values, which are measured while the settling time measurement operation (S630) and the control parameter update operation (S620) are repeated, to detect a maximum power point. According to an exemplary embodiment, the controller may determine whether a count value is minimum through a trend of fluctuation of the count value over time. For example, control parameter values of a minimum point at which the decreasing count value begins to increase may be selected as a maximum power point. According to another exemplary embodiment, the controller may select control a parameter value showing the smallest count value from among count values stored during one switching period as a maximum power point. In a control parameter output operation S670, the controller outputs the control parameter values selected as the maximum power point and finishes one period of the MPPT process.

In a more specific embodiment of FIG. 6, first, a DCW of the DC-DC converter is initialized (S610). An initial value of the DCW is set to a maximum duty cycle. In the settling time measurement operation (S630), the controller measures a settling time of the DC-DC converter, which is controlled with PWM based on the set DCW, through a count value. Subsequently, in the maximum power point determination operation (S650), the controller detects a lowest point at which the decreasing count value begins to increase and outputs a DCW value of the lowest point as a maximum power point value. In the illustrated exemplary embodiment, when the measured count value is not the minimum value, the controller repeats the MPPT loop while updating the DCW by the unit size from the maximum value to the minimum value (S620). In the control parameter output operation (S670), the controller outputs the DCW determined as the maximum power point to the DC-DC converter.

In another more specific embodiment of FIG. 6, first, a CCW of the DC-DC converter is initialized (S610). The CCW may be initialized so that a core having the largest size is selected from among a plurality of cores included in the DC-DC converter (S610). In the settling time measurement operation (S630), the controller measures a settling time of the DC-DC converter, of which a core is selected according to the set CCW, through a count value. Subsequently, in the maximum power point determination operation (S650), the controller detects a lowest point at which the decreasing count value begins to increase and outputs a CCW value of the lowest point as a maximum power point value. In the illustrated exemplary embodiment, when the measured count value is not the minimum value, the controller repeats the MPPT loop while updating the CCW so that a core having the next largest size is selected (S620). In the control parameter output operation (S670), the controller outputs the CCW determined as the maximum power point to the DC-DC converter.

Figure 7:
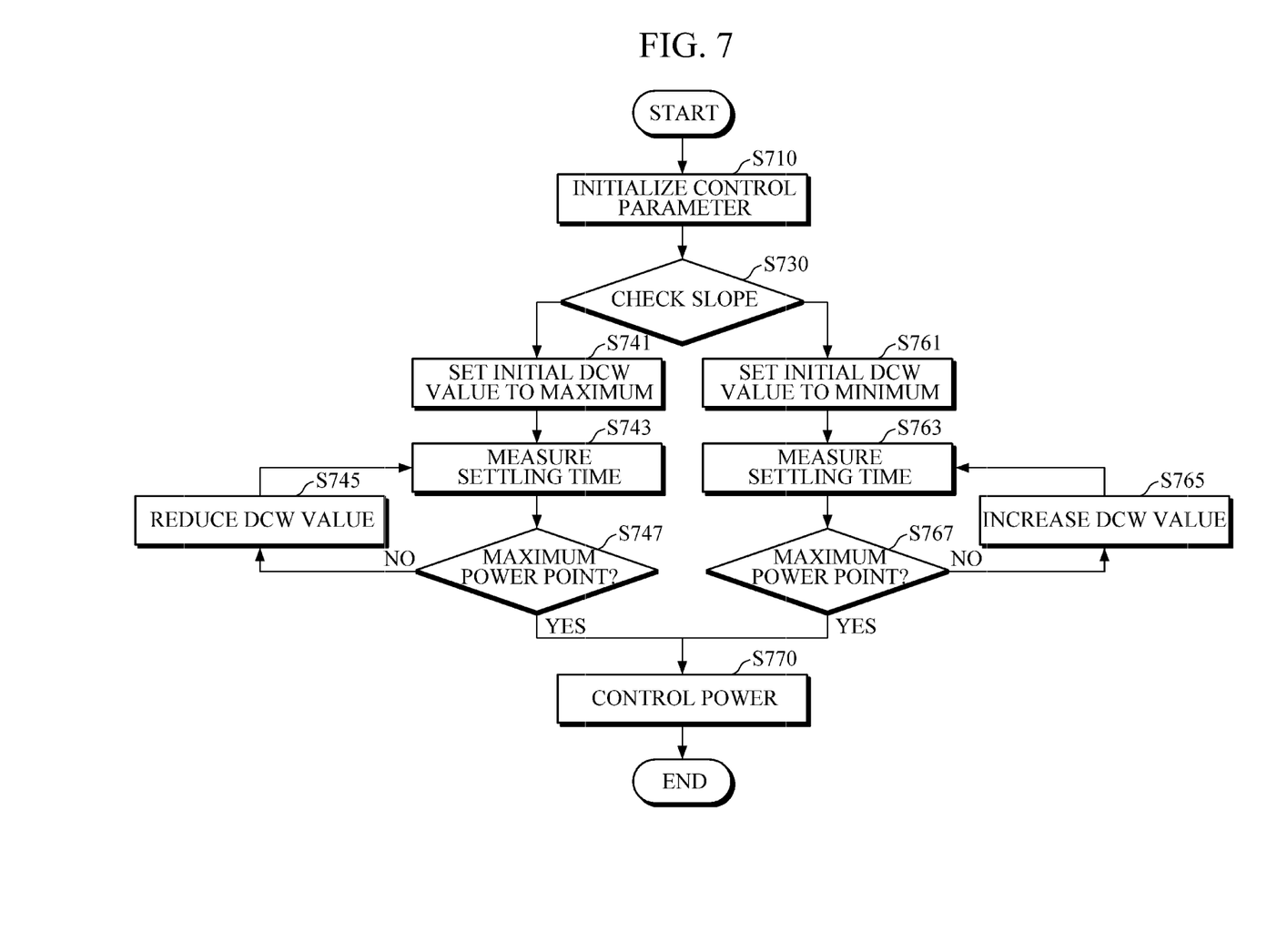
FIG. 7 is a flowchart illustrating an MPPT control method in an energy harvesting system according to a second exemplary embodiment.

FIG. 7 is a flowchart illustrating an MPPT control method in an energy harvesting system according to a second exemplary embodiment. First, a control parameter for controlling the operation of the DC-DC converter is initialized (S710). Subsequently, a controller checks a slope (S730). Subsequently, an initial duty value is set to the maximum or minimum according to a slope value. In FIG. 4, the slope of a settling time corresponds to the derivative of a charging curve. When the slope is positive, the charging curve is increasing from a low value, and thus the initial duty value is set to the minimum. When the slope is negative, charging is sufficiently performed and enters a settled state, and thus the initial duty value is set to the maximum.

When the initial duty value is set to the maximum (S741), a settling time measurement operation (S743) is performed. In the settling time measurement operation (S743), the controller measures a settling time of the DC-DC converter, which is controlled with PWM based on the set DCW, through a count value. The controller counts the time until the output voltage of the DC-DC converter reaches a high reference voltage VREFH. According to an additional aspect, the controller may start time counting from a time point at which the output voltage of the DC-DC converter is a low reference voltage VREFL.

Subsequently, in a maximum power point determination operation (S747), the controller detects a lowest point at which the decreasing count value begins to increase and outputs a DCW value of the lowest point as a maximum power point value. In the illustrated exemplary embodiment, when the measured count value is not the minimum value, the controller repeats an MPPT loop while updating the DCW by decreasing the DCW by a unit size from the maximum value to the minimum value.

When the initial duty value is set to the minimum value (S761), a settling time measurement operation (S763) is performed. In the settling time measurement operation (S763), the controller measures a settling time of the DC-DC converter, which is controlled with PWM based on the set DCW, through a count value. The controller counts the time until the output voltage of the DC-DC converter reaches the high reference voltage VREFH. According to an additional aspect, the controller may start time counting from a time point at which the output voltage of the DC-DC converter is the low reference voltage VREFL.

Subsequently, in a maximum power point determination operation S767, the controller detects a lowest point at which the decreasing count value begins to increase and outputs a DCW value of the lowest point as a maximum power point value. In the illustrated exemplary embodiment, when the measured count value is not the minimum value, the controller repeats the MPPT loop while updating the DCW by increasing the DCW by the unit size from the minimum value to the maximum value. Subsequently, in a power control operation (S770), the controller finishes one period of MPPT and outputs the determined DCW value to the DC-DC converter.

Figure 8:
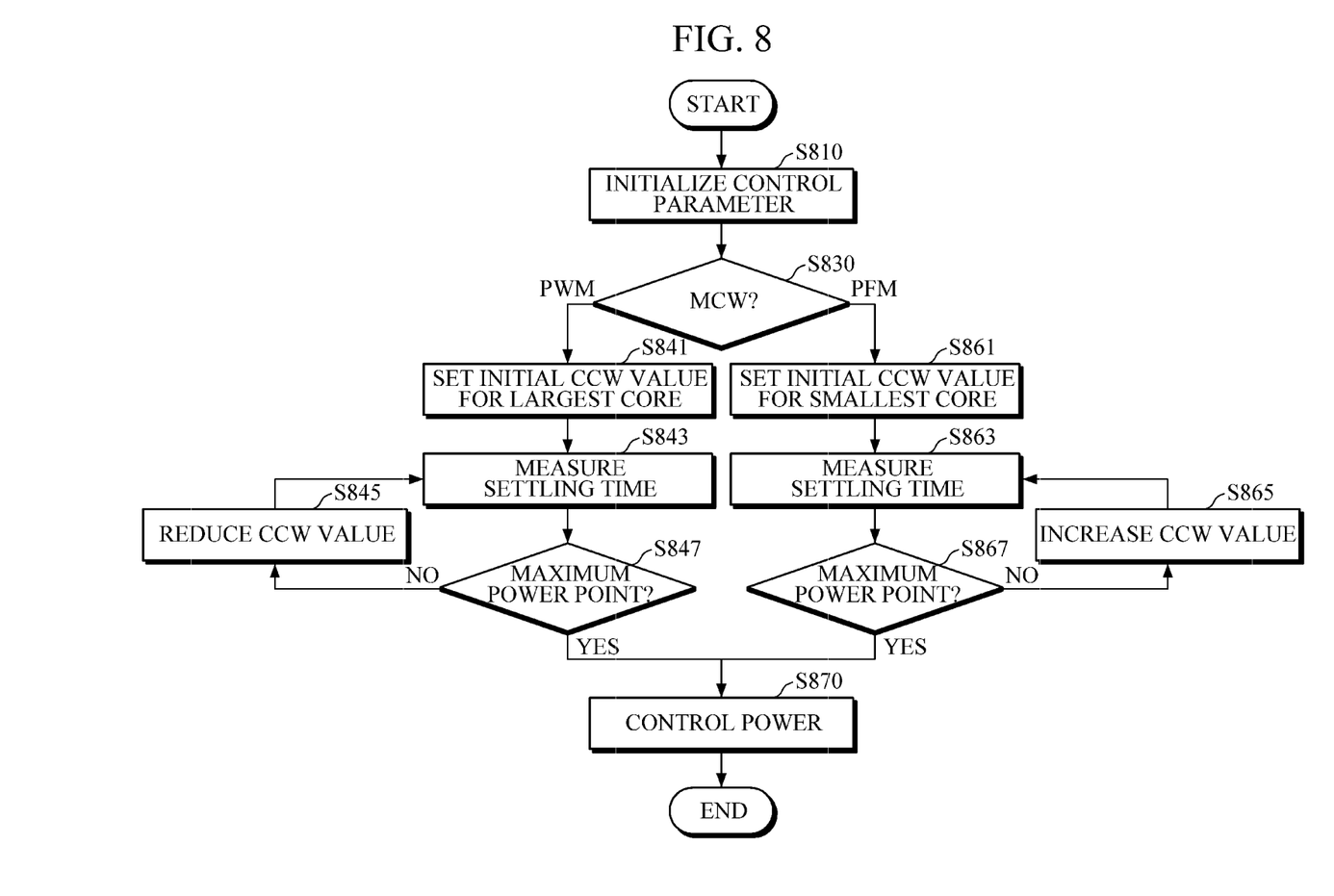
FIG. 8 is a flowchart illustrating an MPPT control method in an energy harvesting system according to a third exemplary embodiment.

FIG. 8 is a flowchart illustrating an MPPT control method in an energy harvesting system according to a third exemplary embodiment. First, a control parameter for controlling the DC-DC converter is initialized (S810). Then, a mode is checked (S830) to initialize a CCW. When an input mode is the PWM mode, a CCW value is set so that a core having the largest size is selected, and when an input mode is the PFM mode, a CCW value is set so that a core having the smallest size is selected.

When an initial value of the CCW is set for the largest core (S841), a settling time measurement operation S843 is performed. In the settling time measurement operation S843, the controller measures a settling time of the DC-DC converter, which is controlled to use the core selected according to the set CCW, through a count value. The controller counts the time until an output voltage of the DC-DC converter reaches a high reference voltage VREFH. According to an additional aspect, the controller may start time counting from a time point at which the output voltage of the DC-DC converter is a low reference voltage VREFL.

Subsequently, in a maximum power point determination operation (S847), the controller detects a lowest point at which the decreasing count value begins to increase and outputs a CCW value of the lowest point as a maximum power point value. In the illustrated exemplary embodiment, when the measured count value is not the minimum value, the controller repeats an MPPT loop while updating the CCW by decreasing the CCW by a unit size from the maximum value to the minimum value so that the next largest core is selected.

When the initial value of the CCW is set for the smallest core (S861), a settling time measurement operation S863 is performed. In the settling time measurement operation S863, the controller measures the settling time of the DC-DC converter, which is controlled to use the core selected according to the set CCW, through a count value. The controller counts the time until an output voltage of the DC-DC converter reaches the high reference voltage VREFH. According to an additional aspect, the controller may start time counting from a time point at which the output voltage of the DC-DC converter is the low reference voltage VREFL.

Subsequently, in a maximum power point determination operation (S867), the controller detects a lowest point at which the decreasing count value begins to increase and outputs a CCW value of the lowest point as a maximum power point value. In the illustrated exemplary embodiment, when the measured count value is not the minimum value, the controller repeats an MPPT loop while updating the CCW by increasing the CCW by the unit size from the minimum value to the maximum value so that the next smallest core is selected. Subsequently, in a power control operation S870, the controller finishes one period of MPPT and outputs the determined CCW to the DC-DC converter.

Figure 9:
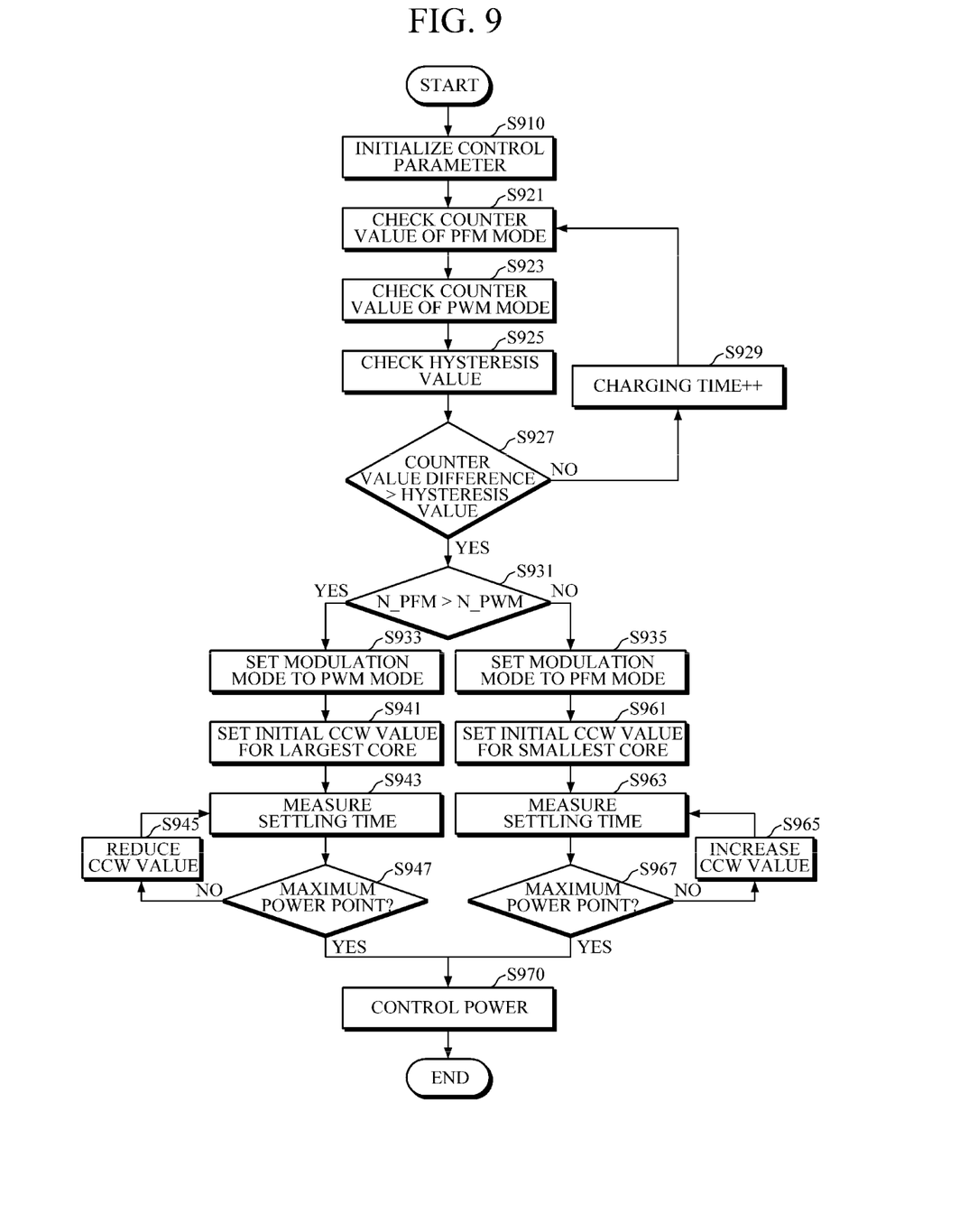
FIG. 9 a flowchart illustrating an MPPT control method in an energy harvesting system according to a fourth exemplary embodiment.

FIG. 9 a flowchart illustrating an MPPT control method in an energy harvesting system according to a fourth exemplary embodiment. As shown in the drawing, the MPPT apparatus in the harvesting system according to the exemplary embodiment initializes a control parameter, for example, a DCW, a CCW, and an RCW, which is an initial value of a load condition, for a DC-DC converter of the illustrated exemplary embodiment (S910). For example, such a DC-DC converter may be the circuit shown in FIGS. 1 and 2.

According to an additional aspect of the proposed invention, the MPPT control method may include modulation mode-specific settling time calculation operations S921 and S923 and modulation mode setting operations S931, S933, and S935. In the modulation mode-specific settling time calculation operations S921 and S923, a controller calculates a count value difference between the PFM mode and the PWM mode. In the illustrated exemplary embodiment, a count value N_PFM is checked first in the PFM mode (S921). When the operation mode is set to the PFM mode by the controller, for example, in the exemplary embodiment shown in FIGS. 1 and 2, the multiplexer 123 selects and outputs a clock generated by the PFM clock generator 122. Here, the control parameters are set to initial values in operation S910. The controller 140 counts an output voltage VOUT according to a control signal supplied through the reference voltage generator 160 and the comparison part 150 and checks a count value N_PFM (S921). As another example, the controller 140 may measure the count values N_PFM of five periods and calculate the average.

Subsequently, a count value N_PWM is checked in the PWM mode (S923). When the operation mode is set to the PWM mode by the controller, for example, in the exemplary embodiment shown in FIGS. 1 and 2, the multiplexer 123 selects and outputs a clock generated by the PWM clock generator 121. Here, the control parameters are set to the initial values in operation S910. The controller 140 counts the output voltage VOUT according to a control signal supplied through the reference voltage generator 160 and the comparison part 150 and checks a count value N_PWM (S923). As another example, the controller 140 may measure the count values N_PWM of five periods and calculate the average.

According to an additional aspect, the MPPT control method may further include load condition determination operations S925, S927, and S929. In the load condition determination operations, when the difference between the count values calculated in the modulation mode-specific settling time calculation operations S921 and S923 is smaller than a modulation reference value, the controller increases a charging time $T_{CH}$ until the difference reaches the modulation reference value.

In other words, the controller checks a preset hysteresis value HYST_VAL (S925). The hysteresis value corresponds to a minimum "reference value" of a difference value for determining characteristics of the two operation modes on the basis of a count value difference resulting from a difference in switching direction when switching is performed between the two modulation modes. When a difference between settling times of the two modulation modes is smaller than the hysteresis value, the difference is within an error range according to switching between the modes, and thus it is not possible to determine which mode is more advantageous. When the charging time $T_{CH}$ is increased by raising a high reference voltage or lowering a low reference voltage, the count value difference is increased. Subsequently, the controller determines whether the absolute value of a value obtained by subtracting the count value N_PWM of the PWM mode checked in operation S923 from the count value N_PFM of the PFM mode checked in operation S921 is larger than the hysteresis value HYST_VAL checked in operation S925 (S927).

When it is determined in operation S927 that the absolute value of the value obtained by subtracting the count value N_PWM of the PWM mode from the count value N_PFM of the PFM mode is smaller than or equal to the hysteresis value HYST_VAL, the controller increases the charging time $T_{CH}$ by increasing the RCW one by one (S929). At this time, the load condition for the charging time is determined. Subsequently, the process is repeated from operation S921.

According to an aspect, in the modulation mode setting operations S931, S933, and S935, when the absolute value of the difference between the count values calculated in the modulation mode-specific settling time calculation operations S921 and S923 is larger than the modulation reference value, the controller sets the modulation mode of the DC-DC converter to the modulation mode in which the count value is smaller. When the absolute value of a value obtained by subtracting the count value N_PWM checked in the PWM mode from the count value N_PFM checked in the PFM mode is larger than the hysteresis value HYST_VAL, the controller determines whether the count value N_PFM of the PFM mode is larger than the count value N_PWM of the PWM mode (S931), and the modulation mode is set to the modulation mode in which the count value is smaller.

When the count value N_PFM of the PFM mode is larger than the count value N_PWM of the PWM mode, the modulation mode is set to the PWM mode which is used for a heavy load (S933). According to an additional aspect, the MPPT control method may include PWM core determination operations S941 to S947. When the modulation mode is set to the PWM mode, in the PWM core determination operations S941 to S947, the controller changes a core size and checks a count value to determine a CCW of a maximum power point.

First, a CCW is initialized. When the modulation mode is set to the PWM mode, an initial value of the CCW is set so that a core having the largest size is selected. When the initial value of the CCW is set for the largest core (S941), a settling time measurement operation S943 is performed. In the settling time measurement operation S943, the controller measures a settling time of the DC-DC converter, which is controlled to use the core selected according to the set CCW, through a count value. The controller counts the time until the output voltage of the DC-DC converter reaches a high reference voltage VREFH. According to an additional aspect, the controller may start time counting from a time point at which the output voltage of the DC-DC converter is a low reference voltage VREFL.

Subsequently, in a maximum power point determination operation S947, the controller detects a lowest point at which the decreasing count value begins to increase and outputs a CCW value of the lowest point as a maximum power point value. In the illustrated exemplary embodiment, when the measured count value is not the minimum value, the controller repeats an MPPT loop while updating the CCW by decreasing the CCW by a unit size from the maximum value to the minimum value so that the next largest core is selected.

When the count value N_PFM of the PFM mode is smaller than or equal to the count value N_PWM of the PWM mode, the modulation mode is set to the PFM mode which is used for a light load (S935). According to an additional aspect, the MPPT control method may include PFM core determination operations S961 to S967. When the modulation mode is set to the PFM mode, in the PFM core determination operations S961 to S967, the controller changes a core size and checks a count value to determine a CCW.

First, a CCW is initialized. When the modulation mode is set to the PFM mode, an initial value of the CCW is set so that a core having the smallest size is selected. When the initial value of the CCW is set for the smallest core (S961), a settling time measurement operation S963 is performed. In the settling time measurement operation S963, the controller measures the settling time of the DC-DC converter, which is controlled to use the core selected according to the set CCW, through a count value. The controller counts the time until the output voltage of the DC-DC converter reaches the high reference voltage VREFH. According to an additional aspect, the controller may start time counting from a time point at which the output voltage of the DC-DC converter is the low reference voltage VREFL.

Subsequently, in a maximum power point determination operation S967, the controller detects a lowest point at which the decreasing count value begins to increase and outputs a CCW value of the lowest point as a maximum power point value. In the illustrated exemplary embodiment, when the measured count value is not the minimum value, the controller repeats an MPPT loop while updating the CCW by increasing the CCW by the unit size from the minimum value to the maximum value so that the next smallest core is selected.

When the maximum power point is determined, in a power control operation (S970), the controller finishes one period of MPPT and outputs the determined CCW value to the DC-DC converter.

In addition, as long as specifications of the DC-DC converter to be controlled allow, when a CCW of a maximum power point is determined in operation S947 of FIG. 9 after the operation mode is set to the PWM mode, the exemplary embodiment for determining a DCW which has been described with reference to FIG. 7 may be performed in succession thereafter.

As described above, according to exemplary embodiments of the present invention, use of analog circuits is avoided. Accordingly, a circuit area is reduced, and a chip area is reduced. Also, a circuit configuration is simplified, and thus power consumption is reduced.

Further, the present invention utilizes the time for the output of a DC-DC converter of an energy harvesting system to settle. Accordingly, no additional tracking time and settling time for MPPT are necessary, and thus the output can rapidly settle. In addition, when the present invention is applied to the modulation mode, the duty cycle, and the core size change of a DC-DC converter, energy can be harvested from a wide input range of energy harvesting sources with maximum efficiency.

Although the exemplary embodiments of the present invention have been described above with reference to the accompanying drawings, the present invention is not limited to the exemplary embodiments and should be construed as encompassing various modifications which can be clearly derived from the exemplary embodiments by those of ordinary skill in the art. The claims are intended to cover such modifications.

What is claimed is:

1. A maximum power point tracking (MPPT) apparatus for an energy harvesting system, the MPPT apparatus comprising:
a comparison part including a first comparator configured to compare an output voltage of a direct current (DC)-DC converter with a high reference voltage; and
a controller including a counter, which operates on the basis of a signal output through the comparison part and measures a time for the output voltage of the DC-DC converter to reach the high reference voltage, and a power controller which outputs a control parameter of the DC-DC converter for minimizing a count value while updating the control parameter,
wherein the power controller comprises:
a modulation mode-specific settling time calculator configured to calculate a difference between count values in a pulse frequency modulation (PFM) mode and a pulse width modulation (PWM) mode; and
a modulation mode setter configured to set a modulation mode of the DC-DC converter to the modulation mode in which the count value is smaller when the difference between the count values calculated by the modulation mode-specific settling time calculator is larger than a modulation reference value.

2. The MPPT apparatus of claim 1, wherein the control parameter of the DC-DC converter includes a mode control word for setting the DC-DC converter to operate in one of a pulse width modulation (PWM) mode and a pulse frequency modulation (PFM) mode or a core control word for selecting one of a plurality of cores of the DC-DC converter having different sizes.

3. The MPPT apparatus of claim 1, wherein the comparison part further includes a second comparator configured to compare the output voltage of the DC-DC converter with a low reference voltage, and
the counter counts a time from an output time point of the second comparator of the DC-DC converter to an output time point of the first comparator.

4. The MPPT apparatus of claim 3, further comprising a discharge part configured to discharge the output voltage at a level of the low reference voltage or less according to control of the controller after the DC-DC converter reaches the high reference voltage.

5. The MPPT apparatus of claim 3, further comprising a reference voltage generator configured to generate and output the low reference voltage and the high reference voltage determined according to control of the controller to the comparison part.

6. The MPPT apparatus of claim 1, wherein the power controller further comprises a load condition determiner configured to increase a charging time among the charging time and a discharge time of a switching period until the difference between the count values reaches the modulation reference value when the difference between the count values calculated by the modulation mode-specific settling time calculator is smaller than or equal to the modulation reference value.

7. The MPPT apparatus of claim 1, wherein the power controller further comprises:
a pulse width modulation core determiner configured to change a core size and check the count value to determine the core size when it is determined that the modulation mode is the PWM mode; and
a pulse frequency modulation core determiner configured to change the core size and check the count value to determine the core size when it is determined that the modulation mode is the PFM mode.

8. The MPPT apparatus of claim 1, wherein the power controller comprises a duty determiner configured to determine and output a pulse width modulation duty cycle of the DC-DC converter so that the count value of the counter is reduced.

9. A maximum power point tracking (MPPT) control method performed by an MPPT controller connected to a direct current (DC)-DC converter of an energy harvesting system, the MPPT control method comprising:
a modulation mode-specific settling time calculation operation of calculating a difference between count values in a pulse frequency modulation (PFM) mode and a pulse width modulation (PWM) mode; and
a modulation mode setting operation of setting a modulation mode of the DC-DC converter to the modulation mode in which the count value is smaller when the difference between the count values calculated in the modulation mode-specific settling time calculation operation is larger than a modulation reference value.

10. The MPPT control method of claim 9, further comprising a load condition determination operation of increasing a charging time until the difference between the count values calculated in the modulation mode-specific settling time calculation operation reaches the modulation reference value when the difference between the count values is smaller than or equal to the modulation reference value.

11. The MPPT control method of claim 9, further comprising:

a PWM core determination operation of changing a core size and checking the count value to determine the core size when it is determined that the modulation mode is the PWM mode; and a PFM core determination operation of changing a core size and checking the count value to determine the core size when it is determined that the modulation mode is the PFM mode.

12. The MPPT control method of claim 11, wherein the PWM core determination operation further comprises a duty determination operation of determining and outputting a PWM duty cycle of the DC-DC converter so that the count value is reduced.

* * * * *